(12) United States Patent
Berestov et al.

(10) Patent No.: US 8,077,964 B2
(45) Date of Patent: Dec. 13, 2011

(54) TWO DIMENSIONAL/THREE DIMENSIONAL DIGITAL INFORMATION ACQUISITION AND DISPLAY DEVICE

(75) Inventors: Alexander Berestov, San Jose, CA (US); Chuen-Chien Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1303 days.

(21) Appl. No.: 11/725,884

(22) Filed: Mar. 19, 2007

(65) Prior Publication Data

US 2008/0232680 A1     Sep. 25, 2008

(51) Int. Cl.
*G06K 9/36* (2006.01)

(52) U.S. Cl. .................. 382/154; 382/285

(58) Field of Classification Search .......... 382/154, 382/214, 285, 307
See application file for complete search history.

(56) References Cited

U.S. PATENT DOCUMENTS

| | | | |
|---|---|---|---|
| 4,751,570 A | 6/1988 | Robinson | 358/88 |
| 4,947,347 A | 8/1990 | Sato | 364/522 |
| 4,965,840 A | 10/1990 | Subbarao | 382/1 |
| 5,148,209 A | 9/1992 | Subbarao | 354/400 |
| 5,365,597 A | 11/1994 | Holeva | 382/8 |
| 5,577,130 A | 11/1996 | Wu | 382/106 |
| 5,604,537 A | 2/1997 | Yamazaki et al. | 348/350 |
| 5,703,637 A | 12/1997 | Miyazaki et al. | 348/53 |
| 5,752,100 A | 5/1998 | Schrock | 396/129 |
| 5,974,272 A | 10/1999 | Kiesow et al. | 396/140 |
| 6,163,336 A | 12/2000 | Richards | 348/42 |
| 6,177,952 B1 | 1/2001 | Tabata et al. | 348/47 |
| 6,252,707 B1 | 6/2001 | Kleinberger et al. | 359/465 |
| 6,262,743 B1 | 7/2001 | Allio | 345/427 |
| 6,477,267 B1 | 11/2002 | Richards | 382/154 |
| 6,512,892 B1 | 1/2003 | Montgomery et al. | 396/326 |
| 6,535,243 B1 | 3/2003 | Tullis | 348/207.1 |

(Continued)

FOREIGN PATENT DOCUMENTS

JP     10108152     4/1998

(Continued)

OTHER PUBLICATIONS

Earl Wong ("A new Method for Creating a Depth Map for Camera Auto Focus Using an All in Focus Picture and 2D Scale Space Matching" Acoustics, Speech and Signal Processing, 2006. ICASSP 2006 Proceedings. 2006 IEEE International Conference on vol. 3, May 14-19, 2006 pp. III-1184 to 1187.*

(Continued)

*Primary Examiner* — Sheela Chawan
(74) *Attorney, Agent, or Firm* — Haverstock & Owens LLP

(57) ABSTRACT

A two dimensional/three dimensional (2D/3D) digital acquisition and display device for enabling users to capture 3D information using a single device. In an embodiment, the device has a single movable lens with a sensor. In another embodiment, the device has a single lens with a beam splitter and multiple sensors. In another embodiment, the device has multiple lenses and multiple sensors. In yet another embodiment, the device is a standard digital camera with additional 3D software. In some embodiments, 3D information is generated from 2D information using a depth map generated from the 2D information. In some embodiments, 3D information is acquired directly using the hardware configuration of the camera. The 3D information is then able to be displayed on the device, sent to another device to be displayed or printed.

45 Claims, 6 Drawing Sheets

U.S. PATENT DOCUMENTS

| | | | |
|---|---|---|---|
| 6,593,957 B1 | 7/2003 | Christie | 348/42 |
| 6,603,442 B1 | 8/2003 | Hong | 345/7 |
| 6,611,268 B1 | 8/2003 | Szeliski et al. | 345/473 |
| 6,616,347 B1 | 9/2003 | Dougherty | 396/351 |
| 6,664,531 B2 | 12/2003 | Gärtner et al. | 250/208.1 |
| 6,674,895 B2 | 1/2004 | Rafii et al. | 382/154 |
| 6,683,652 B1 | 1/2004 | Ohkawara et al. | 348/347 |
| 6,683,725 B2 | 1/2004 | Wohlstadter | 359/626 |
| 6,710,920 B1 | 3/2004 | Mashitani et al. | 359/463 |
| 6,829,383 B1 | 12/2004 | Berestov | 382/154 |
| 6,876,776 B2 | 4/2005 | Recht | 382/255 |
| 6,891,966 B2 | 5/2005 | Chen | 382/145 |
| 6,925,210 B2 | 8/2005 | Herf | 382/264 |
| 7,019,780 B1 | 3/2006 | Takeuchi et al. | 348/340 |
| 7,035,451 B2 | 4/2006 | Harman et al. | 382/154 |
| 7,115,870 B2 * | 10/2006 | Caron et al. | 250/347 |
| 7,551,770 B2 * | 6/2009 | Harman | 382/154 |
| 7,589,761 B2 * | 9/2009 | Kim | 348/211.2 |
| 7,792,423 B2 * | 9/2010 | Raskar et al. | 396/268 |
| 2003/0067536 A1 | 4/2003 | Boulanger et al. | 348/14.08 |
| 2003/0164875 A1 | 9/2003 | Myers | 348/52 |
| 2003/0231792 A1 | 12/2003 | Zhang et al. | 382/154 |
| 2004/0027450 A1 | 2/2004 | Yoshino | 348/42 |
| 2004/0036763 A1 | 2/2004 | Swift et al. | 348/51 |
| 2004/0075756 A1 | 4/2004 | Bean et al. | 348/239 |
| 2005/0104969 A1 | 5/2005 | Schoelkopf et al. | 348/207.99 |
| 2005/0265580 A1 | 12/2005 | Antonucci et al. | 382/103 |
| 2006/0023197 A1 | 2/2006 | Joel | 355/77 |
| 2006/0120706 A1 | 6/2006 | Cho et al. | 396/17 |
| 2006/0221179 A1 | 10/2006 | Seo et al. | 348/46 |
| 2006/0285832 A1 | 12/2006 | Huang | 386/117 |
| 2007/0040924 A1 | 2/2007 | Cho et al. | 348/335 |
| 2007/0147673 A1 * | 6/2007 | Crandall | 382/128 |

FOREIGN PATENT DOCUMENTS

| | | |
|---|---|---|
| JP | 2004048644 | 12/2004 |

OTHER PUBLICATIONS

"Blickgesteuerte PC-Steuerung", Forschung & Entwicklung, XP-000735834, publication date Aug. 4, 1997, pp. 76-78.

Eugene Hecht, Optics, 3$^{rd}$ Edition, Addison-Wesley, The Propagation of Light, Chapter 4, pp. 126.

3D Display Systems, pp. 27-32.

3D Displays—Newest Computer Peripherals—View 3D Images with 3D Monitors from SeeR p. 1 of 1, Jun. 16, 2004.

DDD—Defining the 3D Experience, p. 1 of 1, Jun. 16, 2004, http://www.ddd.com.

The return of 3D, p. 1 of 2, Jun. 16, 2004, http://www.guardian.co.uk.

Performance of a Convertible, 2D and 3D, Parallax Barrier Autostereoscopic Display, Jonathan Harrold, Adrian Jacobs, Graham J. Wood, 4 pages.

Two Camera Geometry: Stereo Vision Images et al., 11 pages.

StereoGraphics Corporation—SynthaGram Monitor, p. 1 of 3, Jun. 17, 2004, www.stereographics.com/products/synthagram/.

Kodak: Technical Overview: CCD Technology, 3 pages, Jun. 16, 2004.

Autostereoscopic Display Paper Two Demos of Our Active Autostereo Research, 3 pages, Jun. 16, 2004.

Texnai event, Texnai, Inc., 3 pages, Jun. 16, 2004.

Sharp Systems of America, Ingenuity in 3D, 2 pages, Jun. 15, 2004.

Screen Web-Display Graphics, 5 pages, Jun. 18, 2004.

MOBILEBURN.COM, NTT Docomo Introduces a New Phone With 3D Display.

Berthold Klaus Paul Horn, "Robot Vision," 1986, pp. 1-509.

Tony Lindeberg, "Scale-Space Theory in Computer Vision," 1994, pp. 1-423.

21$^{st}$ Century 3D: 3DVX3 Press Release; 21$^{st}$ Century 3D Introduces Uncompressed 4:4:4 Steroscopic camera System—3DVX3; San Jose Convention Center Jan. 18, 2006 SPIE Steroscopic Displays and Applications conference.

Three-dimensional Camera Phone; Smithsonian/NASA ADS Physics Abstract Service; find Similar Abstracts (with default settings below); Electronic Refereed Journal Article (HTML); Full Refereed Journal Article (PDF/Postcript); Reads History; Translate Abstract; Title: Three-dimensional Camera Phone, Authors: Iizuka, Keigo, Publications: Applied Optics IP, vol. 43, pp. 6285-6292, Publication Date: Dec. 2004, Origin: Web, Bibliographic Code: 2004ApOpt..43.62851.

Real-time view interpolation system for a super multiview 3D display; processing; Smithsonian/NASA ADS Physics Abstract Service; find Similar Abstracts (with default settings below); Table of Contents; Also-Read Articles (Reads History); Translate Abstract; Title: Real-Time view interpolation system for a super multiview 3D display: processing implementation and evaluation; Authors: Hamaguchi, Tadahiko; Fujii, Toshiaki; Honda, Toshio; Affiliation: AA(Telecommunications Advancement Organization of Japan) AB (Telecommunications Advancement Organization of Japan and Nagoya Univ.) AC (Telecommunications Advancement Organization of Japan and Chiba Univ.); Publication: Proc. SPIE vol. 4660, p. 105-115, Steroscopic Displays and Virtual Reality Systems IX, Andrew J. Woods; John O. Merritt; Stephen A. Benton; Mark T. Bolas; Eds. (SPIE Homepage); Publication Date: May 2002; Origin: SPIE; Abstract Copyright: © 2002 SPIE—The Internantion Society for Optical Engineering, Downloading of the abstract is permitted for personal use only.; Bibliographic Code: 2002SPIE.4660..105H.

3D displays; Using cellphane to convert a liquid crystal display screen into a three dimensional display (3D laptop computer and 3D Camera phone); Keigo Iizuka; Department of Electrical & Computer Engineering, 35 St. George Street, University of Toronto, Toronto, Ontario, Canada M5S IA4.

* cited by examiner

TWO DIMENSIONAL/THREE DIMENSIONAL DIGITAL INFORMATION ACQUISITION AND DISPLAY DEVICE

FIELD OF THE INVENTION

The present invention relates to the field of two dimensional/three dimensional (2D/3D) imaging. More specifically, the present invention relates to a personal electronic device for 2D/3D acquisition and display.

BACKGROUND OF THE INVENTION

Three dimensional technology has been developing for over a century, yet has never been able to establish itself in the mainstream generally due to complexity and cost for the average user. The emergence of Liquid Crystal Display (LCD) and Plasma screens which are better suited to rendering three dimensional (3D) images than traditional Cathode Ray Tube (CRT) monitors and televisions in both consumer electronics and the computer world has spurred interest in the technology. 3D systems have progressed from being technical curiosities and are now becoming practical acquisition and display systems for entertainment, commercial and scientific applications. With the boost in interest, many hardware and software companies are collaborating on 3D products.

Recently, NTT DoCoMo unveiled the Sharp mova SH251iS handset which is the first to feature a color screen capable of rendering 3D images. A single digital camera allows its user to take two dimensional (2D) images and, then using an editing system, convert them into 3D. The 3D images are sent to other phones with the recipient able to see the 3D images if they own a similarly equipped handset. No special glasses are required to view the 3D images on the auto-stereoscopic system. There are a number of problems with this technology though. In order to see quality 3D images, the user has to be positioned directly in front of the phone and approximately one foot away from its screen. If the user then moves slightly he will lose focus of the image. Furthermore, since only one camera is utilized, it can only take a 2D image and then via the 3D editor, the image is artificially turned into a 3D image. Quality of the image is therefore an issue.

One method of producing a stereoscopic image from a 2D image has been patented in U.S. Pat. No. 6,477,267 to Richards whereby at least one object is identified in the original image; the object or objects are outlined; a depth characteristic is defined for each object; and selected areas of the image are displaced accordingly. As discussed above though, converting a 2D image into a 3D image has a number of problems, most importantly, the quality of the resulting 3D image.

Instead of capturing a 2D image with one camera, U.S. Pat. No. 6,664,531 to Gartner et al., discloses a possible configuration to capture a pair of images using two cameras, which observe the parallax effect of an object. Then the left eye will view one image of this pair of stereoscopic images and the right eye will view the other. The human brain is able to easily merge this pair of images so that the object is viewed as a 3D image.

Another example of acquiring a 3D image with two cameras is disclosed in U.S. Pat. No. 6,512,892 to Montgomery et al. which includes a 3D camera with at least two moveable parallel detector heads.

As described for the DoCoMo product, a user must stay essentially still while viewing a 3D image otherwise he will lose focus. One reason for such an issue is that the image is a multi-image display. Multi-image displays include different images interleaved into a single display medium. The simplest implementation of multi-image displays includes repeating a sequence of left-right images. The distance between each successive image is 65 mm which is equal to the average distance between the viewer's eyes. However, if the viewer moves left or right more than 32 mm, then the viewer will see a reverse 3D image. The reverse 3D image is uncomfortable to view and will cause headaches and pain after a while.

The multi-image display can be improved by utilizing a number of images, each spaced apart by 65 mm. With a number of images, the viewer can move his head left or right and will still see a correct image. However, there are additional problems with this technique. The number of cameras required increases. For example, to have four views, four cameras are needed. Also, since the sets of numbers are repeating, there will still be a position that results in a reverse 3D image, just fewer of them. The reverse image can be overcome by inserting a null or black field between the repeating sets. The black field will remove the reverse 3D issue, but then there are positions where the image is no longer 3D. Furthermore, the number of black fields required is inversely proportional to the number of cameras utilized such that the more cameras used, the fewer black fields required. Hence, the multi-image display has a number of issues that need to be overcome for the viewer to enjoy his 3D experience.

There are a wide variety of viewing apparatuses presently available for viewing 3D images. One type includes viewing apparatuses which require lenses, prisms, or mirrors held in proximity with the viewer's eyes, which are generally less convenient than alternatives which do not require special eyewear. A second type includes lenticular systems which are relatively difficult and expensive to manufacture for high quality image presentation due to the amount of precision associated with their production, if high-resolution images are desired. Moreover lenticular systems will always present images having a lower resolution than the resolution of which the display device to which the lenticular array is attached to is inherently capable. Furthermore, lenticular systems are not well adapted for viewing systems such as computer displays and television, and are therefore not in wide use.

A third type of 3D image viewing apparatus includes parallax barriers for 3D viewing. The systems are grids consisting of transparent sections interspersed with opaque sections that are placed in various relationships to the image being seen or projected, the image is an interspersed composition of regions taken from the left image (to be eventually seen only by the left eye of the viewer) and regions taken from the right image (to be eventually seen only by the right eye of the viewer), the grid or grids being placed in positions which hide regions of the right image from the left eye and hide regions of the left image from the right eye, while allowing each eye to see sections of the display which are showing regions originating from its appropriate image. In such a system, roughly half of the display contains no image.

A fourth type of 3D image viewing apparatus disclosed in U.S. Pat. No. 6,252,707 to Keinberger et al., includes a system for viewing and projection of full-color flat-screen binocular stereoscopic viewing without the use of eyeglasses. Various combinations of light polarizing layers and layers of light rotating means or color filters are used to display a left and right image to the appropriate left or right eye.

One possible option for solving the problems described regarding the multi-image display is a tracking system. U.S. Pat. No. 6,163,336 to Richards discloses an auto-stereoscopic display system with a tracking system. Richards teaches a tracking system that is aware of the position of the viewer and can instruct the display unit to move the position of the displayed images so that they correspond to the correct position of the viewer.

Another problem is the Passive Auto Focus system used in modern digital cameras which function based on measuring the high frequency content of the picture and changing the focus setting until this measure reaches the maximum. Such a method is slow and fails frequently. U.S. Pat. No. 6,616,347 to Dougherty discloses a number of dual camera systems for autofocusing as prior art, although they all have problems including being too bulky, costly, and heavy. Furthermore, there were difficulties aligning parts of the images from the two cameras. U.S. Pat. No. 6,611,268 to Szeliski et al. discloses utilizing two video cameras where at least one of the cameras is a video camera to estimate the depth map of a scene.

Furthermore, while a number of wireless hand-held digital cameras exist as disclosed in U.S. Pat. No. 6,535,243 to Tullis, such wireless devices are devoid of 3D capabilities. Hence the need to explore such possibilities further.

Projection of 3D images has also been developed in the past, but there is a need for advancement. U.S. Pat. No. 6,252,707 to Kleinberger et al. discloses a 3D projector system that comprises of two projectors which project a 3D image on a screen without the need for special eyewear. The projectors have been a motion picture projector, a television projector, a computer-driven projection device, a slide projector, or some other equipment similar in size, hence the size of these projectors is quite large.

Additional technologies have also been developed. Disney created what is called Disney Digital 3D which presents a CGI movie in 3D using special technology that requires only one digital projector.

Philips has developed an auto-stereoscopic lenticular LCD monitor that displays both 2D and 3D images where people at different angles are able to view the screen without special viewing glasses. Philips has also developed a signal processing processor for mobile phones that enables 3D to be rendered in real time.

SUMMARY OF THE INVENTION

A two dimensional/three dimensional (2D/3D) digital acquisition and display device for enabling users to capture 3D information using a single device. In an embodiment, the device has a single movable lens with a sensor. In another embodiment, the device has a single lens with a beam splitter and multiple sensors. In another embodiment, the device has multiple lenses and multiple sensors. In yet another embodiment, the device is a standard digital camera with additional 3D software. In all of the embodiments, 3D information is generated from 2D information using a depth map generated from the 2D information. The 3D information is then able to be displayed on the device, sent to another device to be displayed or printed.

In one aspect, a digital imaging device comprises a lens, a sensor positioned to acquire two dimensional information through the lens, a processor for computing three dimensional information from the two dimensional information and a display coupled to the processor for displaying the three dimensional information. At least one of the lens and the sensor is movable. The two dimensional information is used to generate a real depth map. The digital imaging device is selected from the group consisting of a digital still camera and a digital camcorder. The two dimensional information includes a set of images. The sensor is selected from the group consisting of a charge coupled device and a complementary metal-oxide-semiconductor. The two dimensional information is processed including compression, formatting, resolution enhancement, color enhancement and distortion correction. The three dimensional information is stored in a local memory in a stereo format. The stereo format is one or more of above-below, line-alternate, side-by-side, cyberscope, squashed side-by-side, JPS stereoscopic JPEG and 2D-plus-depth. The display displays two dimensional information. The three dimensional information is viewed without a viewing aid. Alternatively, a viewing aid is needed to view the three-dimensional information. The device further comprises a communication interface for communicating with one or more other devices to transmit and receive the three dimensional information. The communication interface communicates wirelessly. The device further comprises a control interface coupled to the processor for controlling the display.

In another aspect, a digital imaging device comprises a lens, a beam splitter positioned proximate to the lens, a plurality of sensors positioned proximate to the beam splitter for acquiring two dimensional information, a processor coupled to the plurality of sensors for computing three dimensional information from the two dimensional information and a display coupled to the processor for displaying the three dimensional information. The two dimensional information is used to generate a real depth map. The digital imaging device is selected from the group consisting of a digital still camera and a digital camcorder. The two dimensional information includes a set of images. The plurality of sensors are each selected from the group consisting of a charge coupled device and a complementary metal-oxide-semiconductor. The two dimensional information is processed including compression, formatting, resolution enhancement, color enhancement and distortion correction. The three dimensional information is stored in a local memory in a stereo format. The stereo format is one or more of above-below, line-alternate, side-by-side, cyberscope, squashed side-by-side, JPS stereoscopic JPEG and 2D-plus-depth. The display displays two dimensional information. The three dimensional information is viewed without a viewing aid. Alternatively, a viewing aid is needed to view the three-dimensional information. The device further comprises a communication interface for communicating with one or more other devices to transmit and receive the three dimensional information. The communication interface communicates wirelessly. The device further comprises a control interface coupled to the processor for controlling the display.

In another aspect, a digital imaging device comprises a first lens, a second lens, a first sensor positioned to acquire three dimensional information through the first lens, a second sensor positioned to acquire the three dimensional information through the second lens, a processor coupled to the first sensor and the second sensor for processing the three dimensional information and a display coupled to the processor for displaying the three dimensional information. The digital imaging device is selected from the group consisting of a digital still camera and a digital camcorder. The three dimensional information includes a set of images. The first sensor and the second sensor are each selected from the group consisting of a charge coupled device and a complementary metal-oxide-semiconductor. The three dimensional information is processed including compression, formatting, resolution enhancement, color enhancement and distortion correction. The three dimensional information is stored in a local memory in a stereo format. The stereo format is one or more of above-below, line-alternate, side-by-side, cyberscope, squashed side-by-side, JPS stereoscopic JPEG and 2D-plus-depth. The display displays two dimensional information.

The three dimensional information is viewed without a viewing aid. Alternatively, a viewing aid is needed to view the three-dimensional information. The device further comprises a communication interface for communicating with one or more other devices to transmit and receive the three dimensional information. The communication interface communicates wirelessly. The device further comprises a control interface coupled to the processor for controlling the display.

In another aspect, a digital imaging device comprises a lens, a sensor positioned to acquire two dimensional information through the lens, a processor for implementing an application for computing three dimensional information from the two dimensional information and a display coupled to the processor for displaying the three dimensional information. The application is preloaded. Alternatively, the application is available as an add-on. A plurality of images are acquired by the sensor. An angle and/or position relative to a scene is changed to acquire a second image after acquiring a first image. The angle and/or position is changed by freehand. A burst mode can be used to acquire the two dimensional information. The processor implements a distortion correction. The two dimensional information is used to generate a real depth map. The digital imaging device is selected from the group consisting of a digital still camera and a digital camcorder. The two dimensional information includes a set of images. The sensor is selected from the group consisting of a charge coupled device and a complementary metal-oxide-semiconductor. The two dimensional information is processed including compression, formatting, resolution enhancement, and color enhancement. The three dimensional information is stored in a local memory in a stereo format. The stereo format is one or more of above-below, line-alternate, side-by-side, cyberscope, squashed side-by-side, JPS stereoscopic JPEG and 2D-plus-depth. The display displays two dimensional information. The three dimensional information is viewed without a viewing aid. Alternatively, a viewing aid is needed to view the three-dimensional information. The device further comprises a communication interface for communicating with one or more other devices to transmit and receive the three dimensional information. The communication interface communicates wirelessly. The device further comprises a control interface coupled to the processor for controlling the display.

In yet another aspect, a method of acquiring, generating and displaying three dimensional information comprises acquiring two dimensional information, generating a depth map from the two dimensional information, generating three dimensional information from the two dimensional information and the depth map and displaying the three dimensional information. The three dimensional information is displayed on a display on an acquisition device. Alternatively, the three dimensional information is displayed on a display on a secondary device. Alternatively, the three dimensional information is displayed by printing. The two dimensional information is acquired by moving at least one of a movable lens and movable sensor. Alternatively, the two dimensional information is acquired with a beam splitter and a plurality of sensors. Alternatively, the two dimensional information is acquired with a plurality of lenses and a plurality of sensors. Alternatively, the two dimensional information is acquired by taking a plurality of pictures from different angles and/or positions. The plurality of pictures are taken freehand. The plurality of pictures are taken using burst mode. An application is utilized to generate the three dimensional information from the two dimensional information.

DETAILED DESCRIPTION OF THE PREFERRED EMBODIMENT

A 2D/3D acquisition and display device is described herein. The 2D/3D acquisition and display device allows a user to capture 2D information and transform the 2D information into 3D information such as a 3D image. The 2D/3D acquisition and display device is preferably implemented as a Digital Still Camera (DSC) or a digital camcorder.

Figure 1:
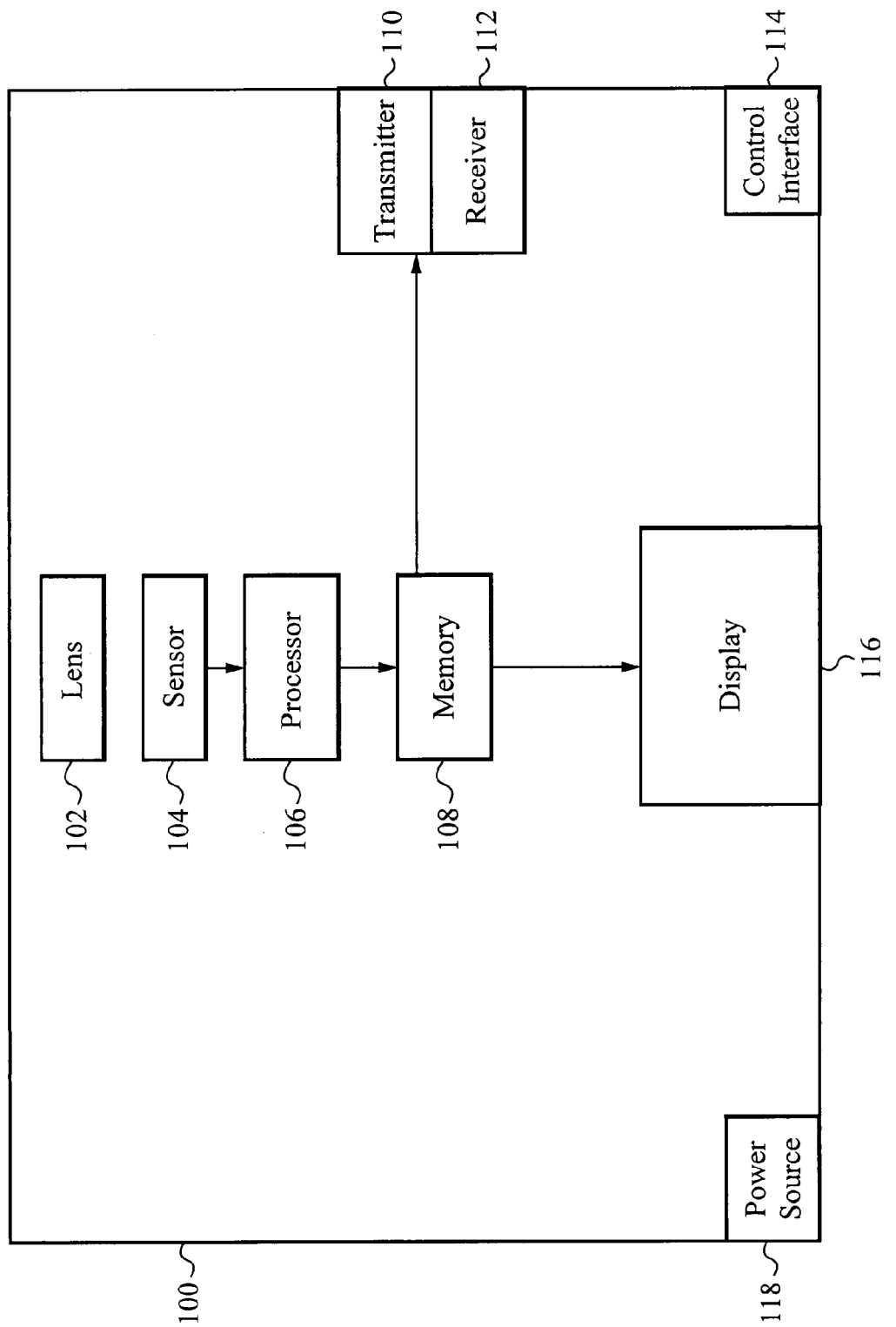
FIG. 1 illustrates a block diagram of an embodiment of a 2D/3D acquisition and display device.

FIG. 1 illustrates a block diagram of an embodiment of the 2D/3D acquisition and display device 100. The 2D/3D acquisition and display device 100 includes a number of components to ensure proper functionality of the device. A movable lens 102 and a sensor 104 are utilized in the process of acquiring 2D information. Although the lens 102 is described as movable herein, in some embodiments, the lens 102 and/or the sensor 104 are movable. The sensor 104 is able to be any digital imagery sensor such as a Charge Coupled Device (CCD) or CMOS imaging device. The movable lens 102 enables the capture of multiple 2D images at different depths, and then a real depth map is generated using the 2D information as described in U.S. patent application Ser. No. 11/473,694 filed Jun. 22, 2006, entitled, "Method of and Apparatus for Generating a Depth Map Utilized in Autofocusing," which is also incorporated by reference herein. Preferably, a processor 106 generates the real depth map from the 2D information. The depth map is able to be utilized for autofocusing. The depth map is a real depth map because there is enough information based on the acquired images to determine how near or far objects really are. The processor 106 is also utilized to process the 2D information further, including compression, formatting, generating 3D information from the 2D information and the real depth map, resolution enhancement, color enhancement, distortion correction and eventually storage of the 2D and 3D information in a local memory 108. Software and/or additional hardware are also utilized in generating 3D information from the 2D information and the real depth map. The 3D information is stored in one or more of a variety of formats including, but not limited to, above-below, line-alternate, side-by-side, cyberscope, squashed side-by-side, JPS stereoscopic JPEG and 2D-plus-depth.

A transmitter 110 is optionally available for transmitting the 3D information to one or more other electronic devices, for example, a display device, and a receiver 112 is optionally included to receive 3D information from another electronic device. The 3D information is transmitted to the electronic device by any appropriate means, including but not limited to, wired, wireless, infrared, radio-frequency, cellular and satellite transmission. There are many possibilities for display devices to display the 3D information. One display device utilizes a parallax barrier technology which is used as a 3D autostereoscopic display or a 2D display. The parallax barrier comprises an array of slits spaced at a defined distance from a pixel plane. The intensity distribution across the window is modeled as a convolution of the detailed pixel structure and the near field diffraction through the aperture of the slit which results in an intensity variation at the window plane. Further, parallax barriers need to be aligned to the LCD with a high degree of precision. The parallax barrier is able to be made transparent to allow conversion between 2D and 3D.

Another display device utilizes lenticular elements to display the 3D information. Lenticular elements are typically cylindrical lenses arranged vertically with respect to a 2D display such as an LCD. The cylindrical lenses direct diffuse light from a pixel so it is only seen at a limited angle in front of the display. Thus, different pixels are directed to either left or right viewing angles. A 2D/3D switching diffuser is coupled to the front of the lenticular element to allow the viewer to switch between 2D and 3D. When the 2D/3D switching diffuser is off it scatters light and prevents the light from reaching the lenticular lens which results in similar performance to a normal 2D display.

Another display device includes using an array of vertically oriented micro-prisms as the parallax element, and the left and right images, vertically interlaced in columns, are directed to two viewing windows by the micro-prisms.

Another display device includes using a series of stacked micro-polarizer elements to generate a switchable parallax barrier. The micro-polarizer elements are constructed inside the LCD element to avoid common parallax problems.

Another display device incorporates a viewing aid such as colored, polarized, or switching glasses to view the 3D information where the stereoscopic display is not autostereoscopic.

Yet another display device includes utilizing a beamsplitter which uses light polarization to separate left-eye and right-eye stereoimages and direct the proper image to the appropriate eye.

In addition to being able to transmit the 3D information to another device, the 2D/3D acquisition and display device 100 includes a display 116 to display the stored 3D information. The display 116 also comprises one or more of a variety of appropriate and available 3D display technologies to display the 3D information. Preferably, the display 116 is built-in to the 2D/3D acquisition and display device 100. Preferably, the display 116 is able to toggle between 2D display and 3D display so that a user is able to view images or video in the dimensions he/she desires. As described above, there are many types of 3D displays available which are able to be incorporated within the 2D/3D acquisition and display device 100. Preferably, the 2D/3D acquisition and display device 100 is a portable size comparable to standard digital cameras and camcorders, so the display 116 is an appropriate size. From above, some types of displays that are included within the 2D/3D acquisition and display device 100 are auto-stereoscopic displays and displays that utilize special glasses.

In addition to the 3D information being displayed on an electronic display, the 3D information is also able to be printed for 3D viewing.

A control interface 114 is optionally utilized to allow a viewer to control a number of aspects of the electronic device 100 including settings and other features. The control interface 114 is implemented in hardware and/or software. A power source 118 provides power to the 2D/3D acquisition and display device 100. Together, the components of the 2D/3D acquisition and display device 100 allow a user to acquire 2D/3D information, optionally transmit the 2D/3D information to another device and display the 2D/3D information.

Figure 2:
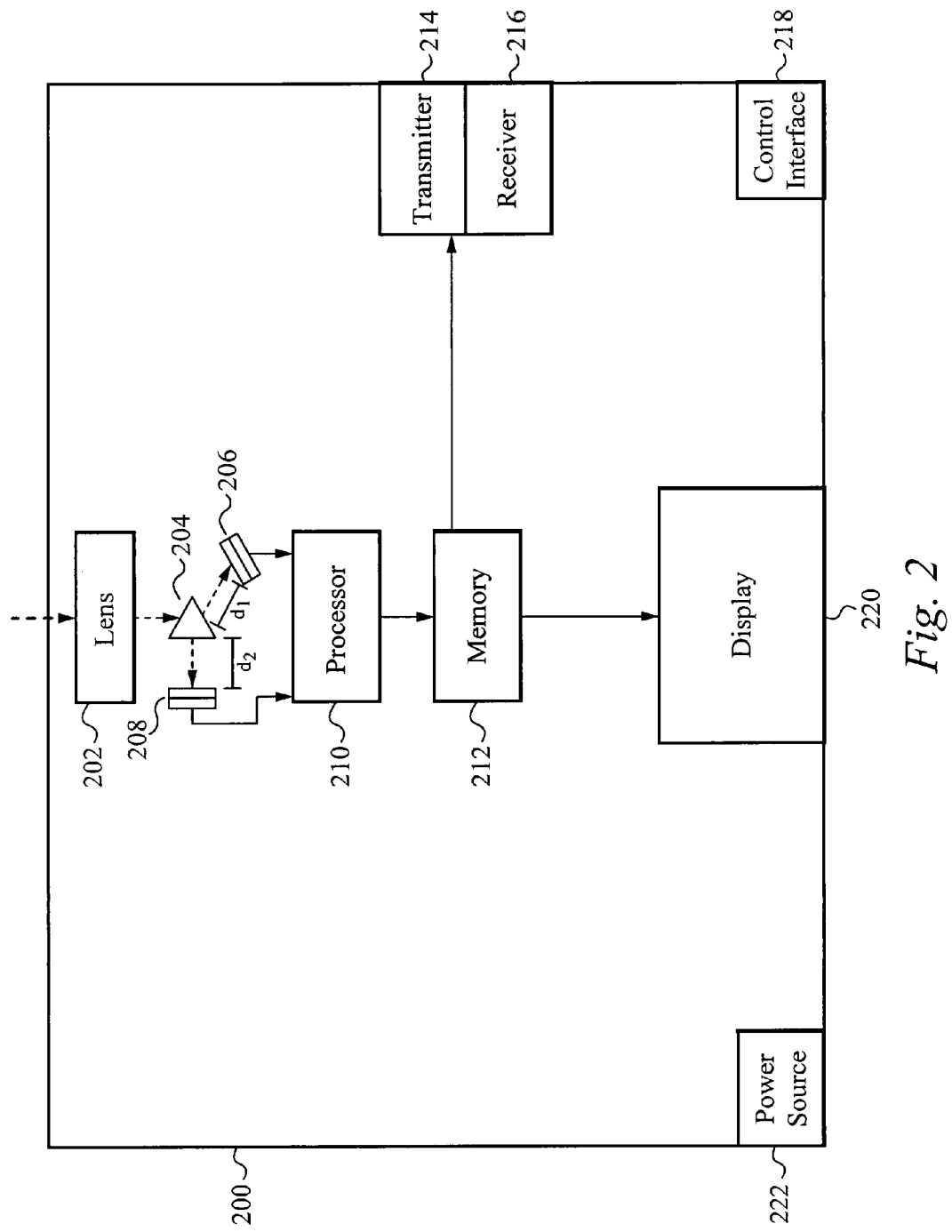
FIG. 2 illustrates a block diagram of an embodiment of a 2D/3D acquisition and display device.

FIG. 2 illustrates a block diagram of an embodiment of the 2D/3D acquisition and display device 200. The 2D/3D acquisition and display device 200 includes a number of components to ensure proper functionality of the device. A lens 202 is used with a beam splitter 204, a first sensor 206 and a second sensor 208 to acquire 2D information which includes multiple copies of an image at different depths so that the blur of each image is different. The first and second sensors 206 and 208 are able to be any digital imagery sensor such as a CCD or CMOS imaging device. As shown in FIG. 2, the first sensor 206 is a distance d1 from the beam splitter 204, and the second sensor 208 is a distance d2 from the beam splitter where d1 and d2 are not equal. By capturing the image with two different blur quantities, it is possible to generate a real depth map as described in U.S. patent application Ser. No. 11/357,631 filed Feb. 16, 2006, entitled, "Method of and Apparatus For Capturing and Generating Multiple Blurred Images," which is also incorporated by reference herein. Preferably, a processor 210 generates the real depth map from the 2D information. The depth map is able to be utilized for autofocusing. The processor 210 is also utilized to process the 2D information further including compression, formatting, generating 3D information from the 2D information and the real depth map, resolution enhancement, color enhancement, distortion correction and eventually storage of the 2D and 3D information in a local memory 212. Software and/or additional hardware are also utilized in generating 3D information from the 2D information and the real depth map. The 3D information is stored in one or more of a variety of formats including, but not limited to, above-below, line-alternate, side-by-side, cyberscope, squashed side-by-side, JPS stereoscopic JPEG and 2D-plus-depth.

A transmitter 214 is optionally available for transmitting the 3D information to one or more other electronic devices. A receiver 216 is optionally included to receive 3D information from another electronic device. As described above, the other electronic devices are able to be or have displays which display 3D information in a variety of ways. Furthermore, the 3D information is transmitted to the electronic device by any appropriate means, including but not limited to, wired, wireless, infrared, radio-frequency, cellular and satellite transmission.

In addition to being transmitted to another device, the 2D/3D acquisition and display device 200 includes a display 220 to display the stored 3D information. As described above, the display 220 also comprises one or more of a variety of appropriate and available 3D display technologies to display the 3D information. A control interface 218 is optionally utilized to allow a viewer to control a number of aspects of the electronic device 200 including settings and other features. A power source 222 provides power to the 2D/3D acquisition and display device 200. Together, the components of the 2D/3D acquisition and display device 200 allow a user to acquire 2D/3D information, optionally transmit the 2D/3D information to another device and display the 2D/3D information.

In addition to the 3D information being displayed on an electronic display, the 3D information is also able to be printed for 3D viewing.

Figure 3:
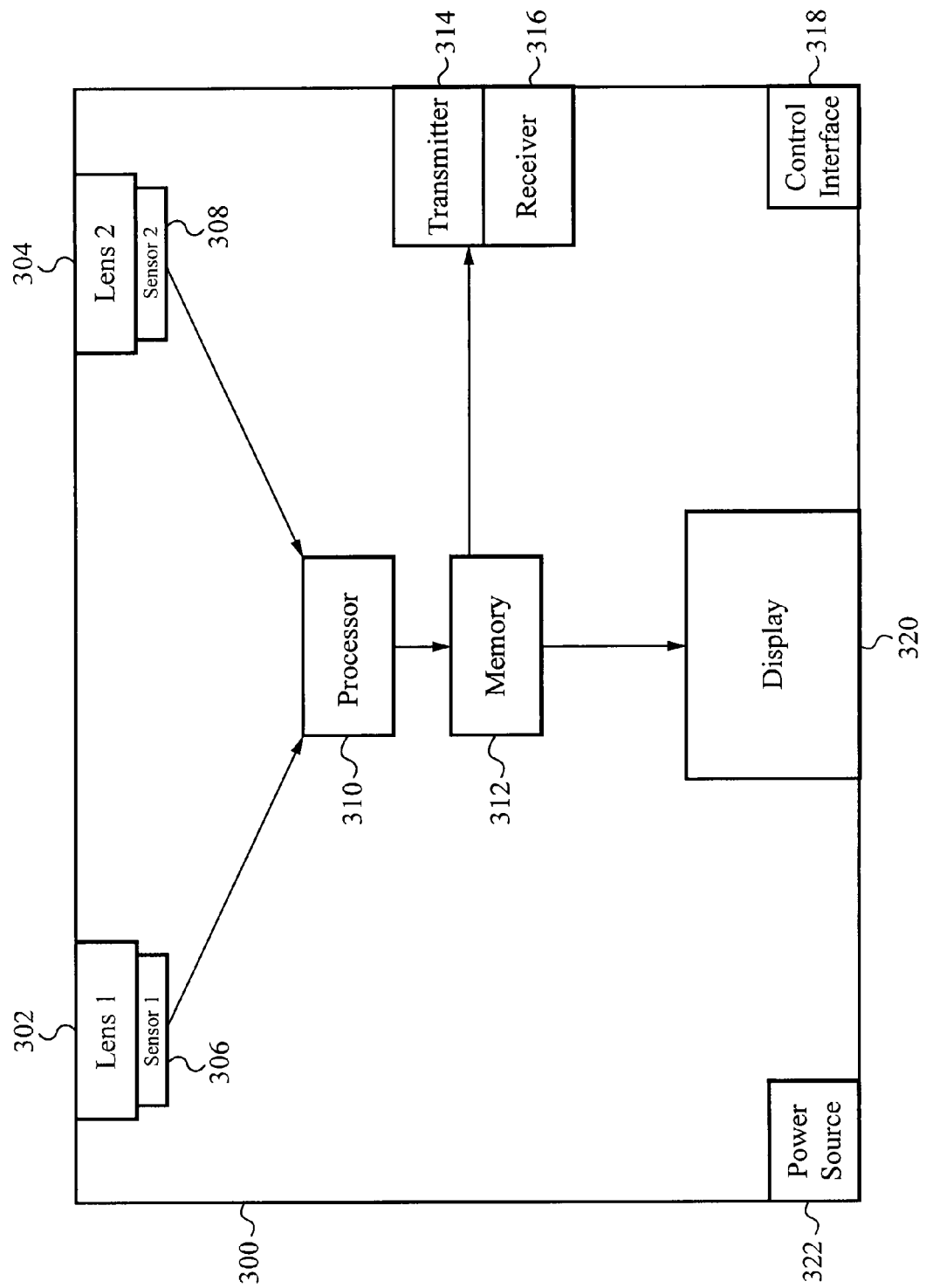
FIG. 3 illustrates a block diagram of an embodiment of a 2D/3D acquisition and display device.

FIG. 3 illustrates a block diagram of an embodiment of a 2D/3D acquisition and display device with multiple lenses 300. The 2D/3D acquisition and display device with multiple lenses 300 is similar to U.S. patent application Ser. No. 10/915,648 filed Aug. 9, 2004, entitled, "Three Dimensional Acquisition and Visualization System for Personal Electronic Devices," which is incorporated by reference herein and which claims priority under 35 U.S.C. §119(e) of the U.S. provisional application Ser. No. 60/554,673 filed on Mar. 18, 2004 and entitled "Three-Dimensional Acquisition and Visualization System for Personal Electronic Devices," which is also incorporated by reference herein. The 2D/3D acquisition and display device with multiple lenses 300 includes a number of components to ensure proper functionality of the device. A first lens 302 and a second lens 304 are located substantially parallel to each other and are utilized in the process of simultaneously acquiring a set of 2D/3D image information. Since stereo pair images are acquired in the 2D/3D information, the 2D/3D information is able to be considered 3D information. A first sensor 306 and a second sensor 308 are positioned proximate to the first lens 302 and the second lens 304, respectively, to properly receive the 2D/3D image information. A processor 310 coupled to the sensors 302 and 304 is used to generate a real depth map, if needed. The depth map is able to be utilized for autofocusing. However, since the 2D/3D information comprises stereo pair images, the real depth map does not have to be generated. The stereo pair images are already 3D information. The processor 310 is also utilized to process the 2D/3D information including compression, formatting, generating 3D information from the 2D/3D information and the real depth map if desired, resolution enhancement, color enhancement, distortion correction and eventually storage of the 2D and 3D information in a local memory 312. Software and/or additional hardware are also utilized in generating 3D information from the 2D information and the real depth map. The 3D information is stored in one or more of a variety of formats including, but not limited to, above-below, line-alternate, side-by-side, cyberscope, squashed side-by-side, JPS stereoscopic JPEG and 2D-plus-depth.

A transmitter 314 is optionally available for transmitting the 3D information to one or more other electronic devices. A receiver 316 is optionally included to receive 3D information from another electronic device. As described above, the other electronic devices are able to be or have displays which display 3D information using a variety of techniques. Furthermore, the 3D information is transmitted to the electronic device by any appropriate means, including but not limited to, wired, wireless, infrared, radio-frequency, cellular and satellite transmission.

In addition to being transmitted to another device, the 2D/3D acquisition and display device with multiple lenses 300 includes a display 320 to display the stored 3D information. As described above, the display 320 also comprises one or more of a variety of appropriate and available 3D display technologies to display the 3D information. A control interface 318 is optionally utilized to allow a viewer to control a number of aspects of the 2D/3D acquisition and display device with multiple lenses 300 including settings and other features. A power source 322 provides power to the 2D/3D acquisition and display device with multiple lenses 300. Together, the components of the 3D acquisition and visualization device within the 2D/3D acquisition and display device with multiple lenses 300 allow a user to acquire 2D/3D information, transmit the 2D/3D information to another device and display the 2D/3D information.

In addition to the 3D information being displayed on an electronic display, the 3D information is also able to be printed for 3D viewing.

Figure 4:
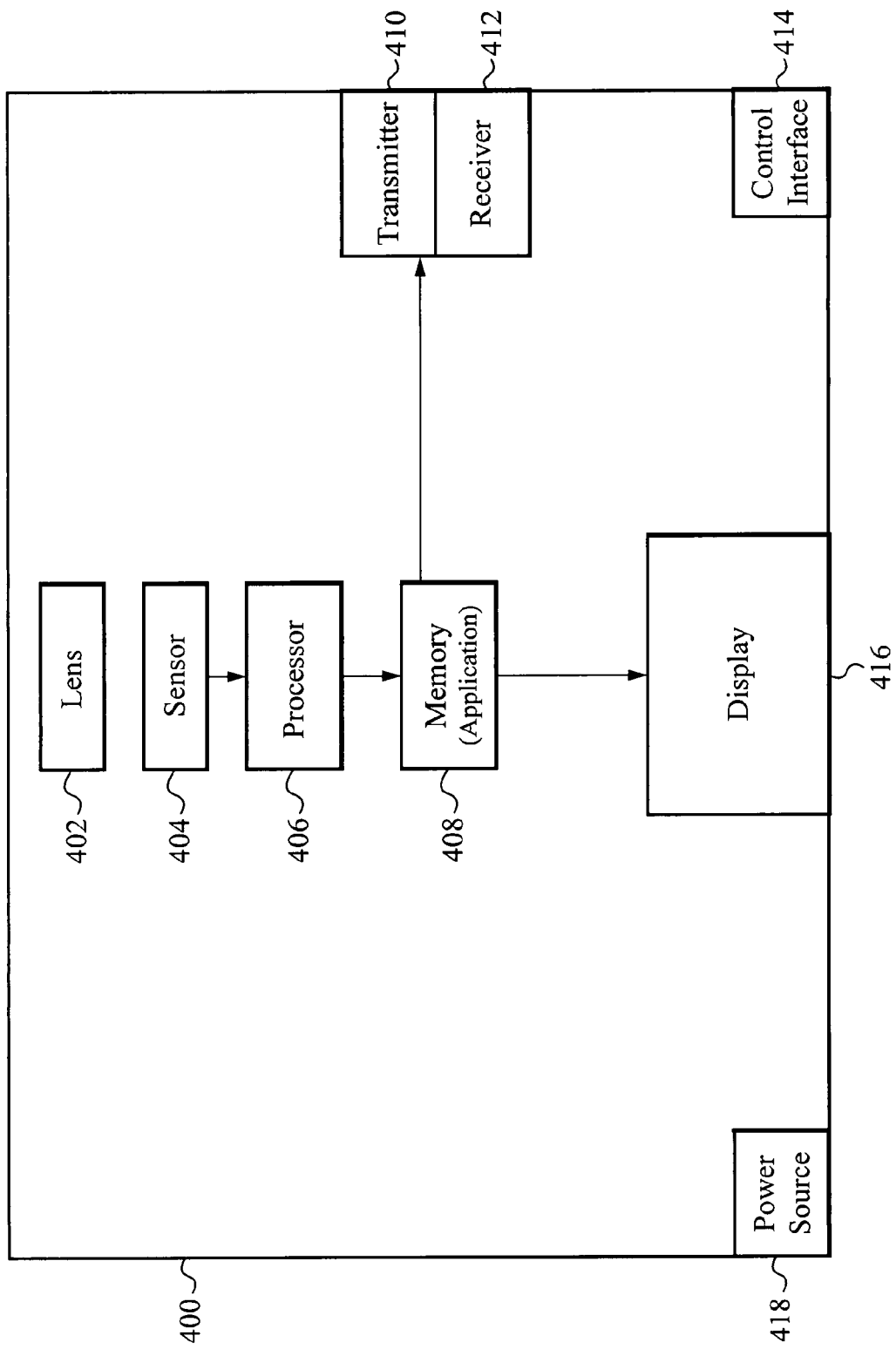
FIG. 4 illustrates a block diagram of an embodiment of a 2D/3D acquisition and display device.

FIG. 4 illustrates a block diagram of an embodiment of a 2D/3D acquisition and display device 400. The 2D/3D acquisition and display device 400 is a standard digital camera with specialized 2D to 3D conversion application loaded on the camera. The camera is able to have the application pre-loaded or available as an add-on. A lens 402 and a sensor 404 are utilized in the process of acquiring 2D information. In this embodiment, the 2D/3D acquisition and display device 400 utilizes the conversion application to convert acquired 2D images into 3D images. Multiple images are taken by a user taking one image and then moving the 2D/3D acquisition and display device 400 to a different location to take a second image of the object/scene. The user is able to move the 2D/3D acquisition and display device 400 a few millimeters or a few feet to acquire an image at a different angle and/or position. Furthermore, the user is able to move the 2D/3D acquisition and display device 400 freehand, meaning the user does not need a specialized setup to take the multiple pictures. Another method of taking multiple images is to use a burst mode within the 2D/3D acquisition and display device 400 where many images are captured in a short amount of time. After multiple images are acquired by the sensor 404, a processor 406 is utilized with the added application to process the 2D information of each image. Processing includes determining a real depth map, compression, formatting, generating 3D information from the 2D information and eventually storage in a local memory 408. Since the 2D information includes stereo pair images, then the 2D information is able to be treated as 3D information, such that a real depth map is not needed, and the 3D information is simply the stereo pair images. Processing is also able to include resolution enhancement and color enhancement. The 3D information is stored in one or more of a variety of formats including, but not limited to, above-below, line-alternate, side-by-side, cyberscope, squashed side-by-side, JPS stereoscopic JPEG and 2D-plus-depth. The application is also able to correct for distortions.

A transmitter 410 is optionally available for transmitting the 3D information to one or more other electronic devices. A receiver 412 is optionally included to receive 3D information from another electronic device. As described above, the other electronic devices are able to be or have displays which display 3D information using a variety of techniques. Furthermore, the 3D information is transmitted to the electronic device by any appropriate means, including but not limited to, wired, wireless, infrared, radio-frequency, cellular and satellite transmission.

In addition to being transmitted to another device, the 2D/3D acquisition and display device 400 includes a display 416 to display the stored 3D information. As described above, the display 416 also comprises one or more of a variety of appropriate and available 3D display technologies to display the 3D information. A control interface 414 is optionally utilized to allow a viewer to control a number of aspects of the 2D/3D acquisition and display device 400 including settings and other features. A power source 418 provides power to the 2D/3D acquisition and display device 400. Together, the components of the 2D/3D acquisition and display device 400 allow a user to acquire 2D/3D information, optionally transmit the 2D/3D information to another device and display the 2D/3D information.

Figure 5:
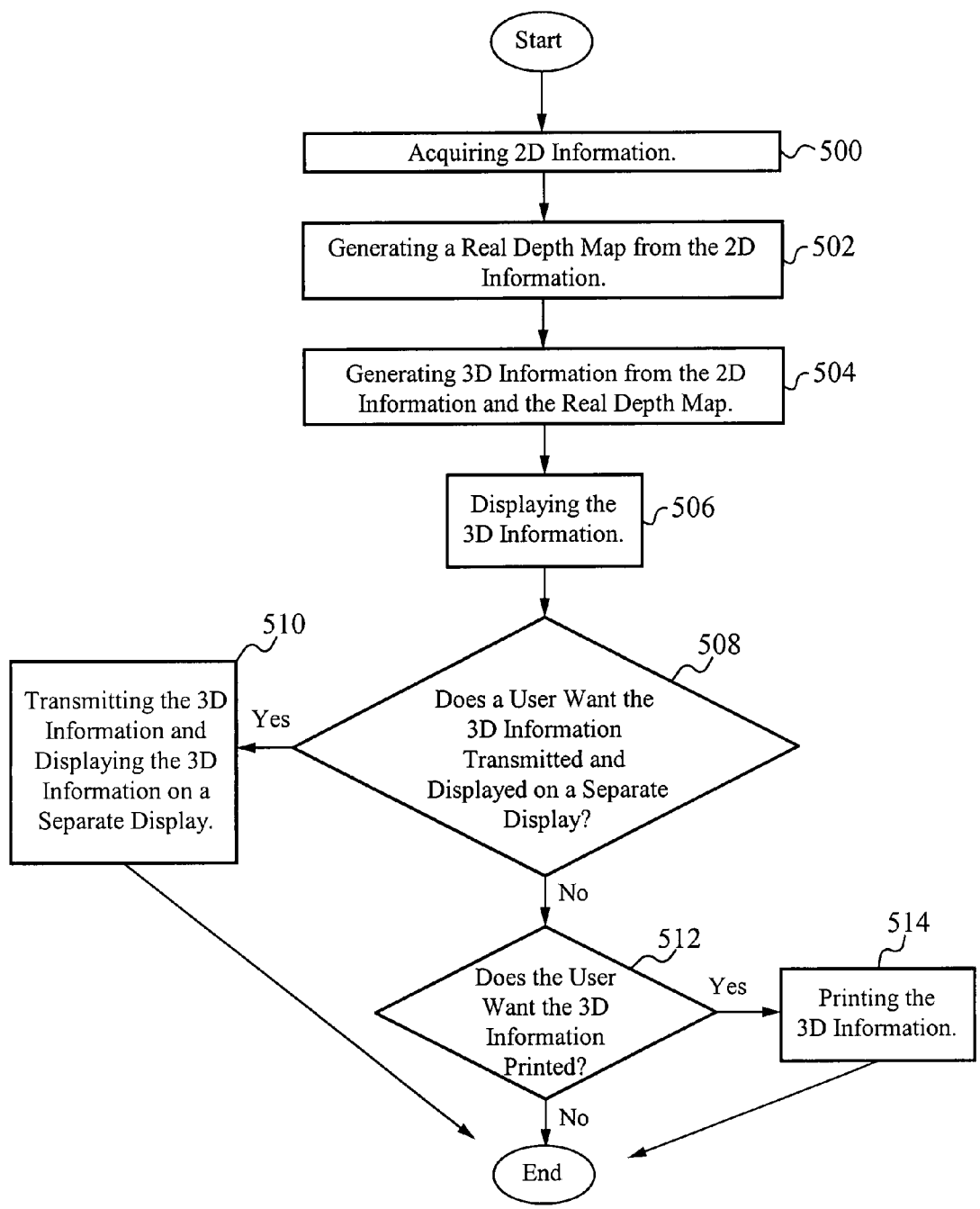
FIG. 5 illustrates a flowchart of a method implemented by a 2D/3D acquisition and display device.

FIG. 5 illustrates a flowchart of a process implemented by the 2D/3D acquisition and display device. In the step 500, 2D information is acquired. The 2D information includes images and/or video. Furthermore, the 2D information is acquired in a multitude of ways. In one embodiment, a movable lens with a sensor acquires the 2D information with different blurs. In another embodiment, a beam splitter splits an image signal so that it goes to two sensors at a different distance from the image, where the blur is different for each acquired image. In another embodiment, multiple lenses and sensors are used to acquire the 2D information from different angles and/or positions at the same time. In yet another embodiment, a standard digital camera is used to acquire the 2D information. Once acquired, a processor processes the 2D information and generates a real depth map in the step 502. The depth map is able to be utilized for autofocusing. As described above, processing the 2D information includes utilizing additional hardware and/or software. Depending on how the 2D information is acquired, different forms of processing are implemented to properly compute the 3D information. Then, in the step 504, the processor converts the 2D information into 3D information using the depth map. In some embodiments, an application is used to convert the 2D information into 3D information. The 3D information is then displayed on the 2D/3D acquisition and display device in the step 506 to a viewer. It is determined if a user wants to transmit the 3D information to another display device to display the 3D information in the step 508. If the user wants to transmit the 3D information, then it is transmitted and displayed on another display in the step 510. It is determined if the user wants to print the 3D information in the step 512. If the user wants to print the 3D information, then the 3D information is printed in the step 514.

Figure 6:
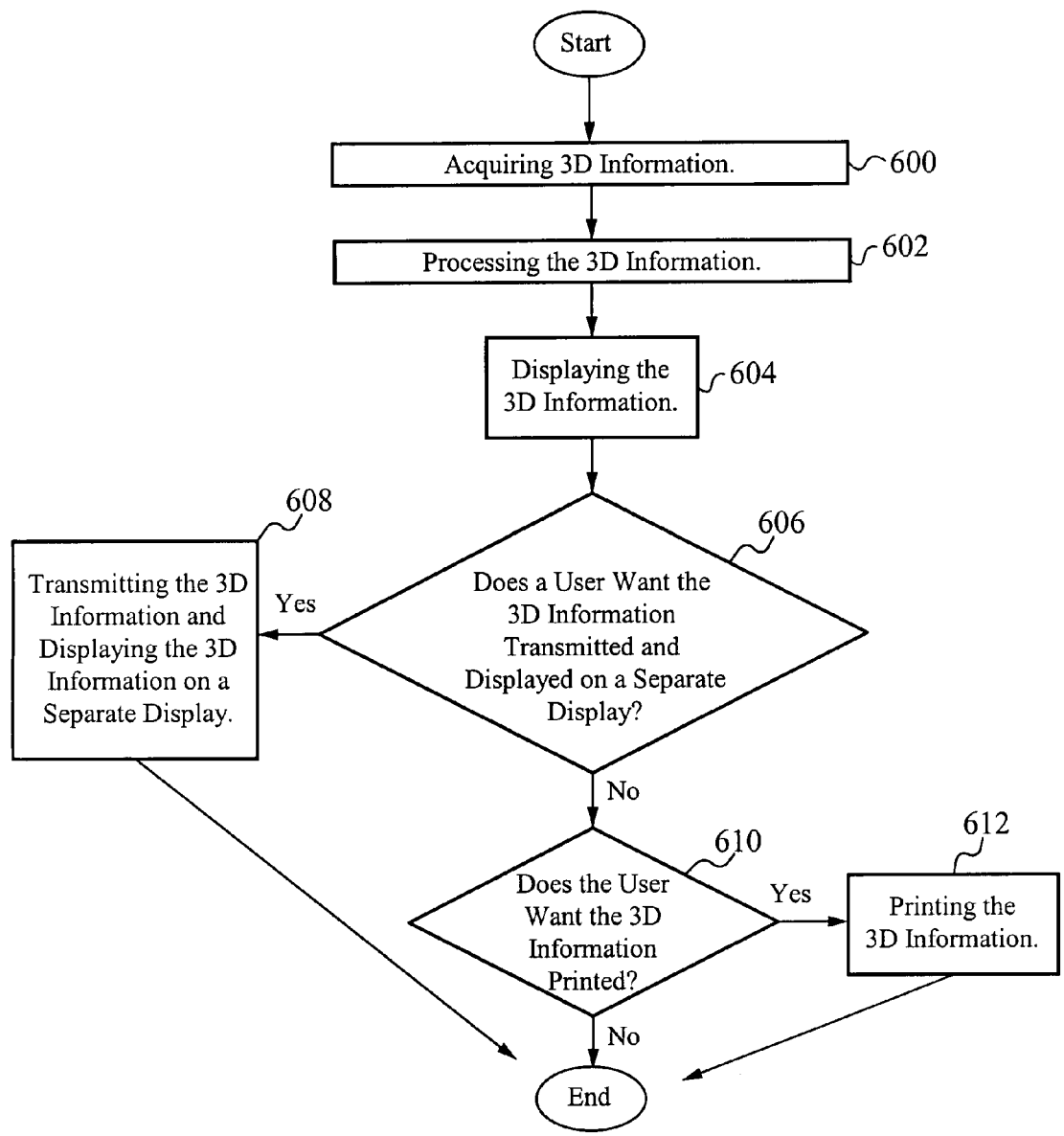
FIG. 6 illustrates a flowchart of a method implemented by a 2D/3D acquisition and display device.

FIG. 6 illustrates a flowchart of a method implemented by the 2D/3D acquisition and display device. In the step 600, 3D information is acquired. The 3D information includes images and/or video. Furthermore, the 3D information is acquired in a multitude of ways. In an embodiment, multiple lenses and sensors are used to acquire the 3D information from different angles at the same time. In another embodiment, a standard digital camera is used to acquire the 3D information by taking two separate pictures of the same object/scene from different angles and/or positions. The 3D information includes stereo pair images. Once acquired, a processor processes the 3D information, in the step 602. As described above, processing the 3D information includes utilizing additional hardware and/or software, if necessary. The 3D information is then displayed on the 2D/3D acquisition and display device in the step 604 to a viewer. It is determined if a user wants to transmit the 3D information to another display device to display the 3D information in the step 606. If the user wants to transmit the 3D information, then it is transmitted and displayed on another display in the step 608. It is determined if the user wants to print the 3D information in the step 610. If the user wants to print the 3D information, then the 3D information is printed in the step 612.

To utilize the 2D/3D acquisition and display device, the device is used similarly to using a standard digital camera or digital camcorder. In some embodiments, the use is slightly different however. In an embodiment where a device has a single movable lens with a sensor, the device acquires multiple images in rapid succession with the sensor slightly moved to determine a depth map. In an embodiment where a device has a single lens with a beam splitter and multiple sensors, a single image with multiple blurs is acquired to generate the depth map. In an embodiment with multiple lenses and multiple sensors, an image is simultaneously acquired for each lens/sensor combination to determine the depth map. Therefore, in all of these embodiments, the user for the most part, experiences no difference when taking a picture or video. In an embodiment where a device is a standard digital camera with additional 3D software, a user is required to take two or more pictures to be used to generate the depth map and the 3D image. Therefore, in this embodiment, for one 3D image, two pictures must be taken. With the implementation of a burst mode, it is possible to take two pictures quickly, so that the user does not experience much difference. After the user has taken the necessary picture or pictures, the images are able to be displayed in 2D or 3D depending on the user's selection. In 3D, depending on the specific technological implementation, the user may experience minor differences in viewing the images, for example, some 3D displays require a straight-on view, otherwise the image will simply look blurred. In general, the user views the images on the display similarly to a standard digital camera or camcorder.

In operation, the 2D/3D acquisition and display device functions substantially similar to a digital camera or digital camcorder. In general, the embodiments described above function similarly. A user takes a picture or multiple pictures using the 2D/3D acquisition and display device, the device then generates a real depth map from the picture data which is then used to generate 3D images. The 3D images are able to then be displayed on the device, transferred to another display device or printed. The difference in the embodiments is how the 2D information is acquired, and how it is transformed into 3D information. In an embodiment, a single movable lens is used with a sensor. In another embodiment, a single lens is used with a beam splitter and two sensors. Another embodiment uses multiple lenses and multiple sensors. Lastly, an embodiment uses a standard digital camera without hardware modifications and software is utilized to transform the 2D information into 3D information. After the 3D information is formed, any of many implementations of displays are able to be used to display the 3D information to the user.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A digital imaging device comprising:
  a. a lens;
  b. a movable sensor positioned to acquire two dimensional information through the lens;
  c. a processor for generating a real depth map from the two dimensional information and for computing a three dimensional image from the two dimensional information and the real depth map; and
  d. a display coupled to the processor for displaying the three dimensional image.

2. The device as claimed in claim 1 wherein the lens is movable.

3. The device as claimed in claim 1 wherein the digital imaging device is selected from the group consisting of a digital still camera and a digital camcorder.

4. The device as claimed in claim 1 wherein the two dimensional information includes a set of images.

5. The device as claimed in claim 1 wherein the sensor is selected from the group consisting of a charge coupled device and a complementary metal-oxide-semiconductor.

6. The device as claimed in claim 1 wherein the two dimensional information is processed including compression, formatting, resolution enhancement, color enhancement and distortion correction.

7. The device as claimed in claim 1 wherein the three dimensional image is stored in a local memory in a stereo format.

8. The device as claimed in claim 7 wherein the stereo format is one or more of above-below, line-alternate, side-by-side, cyberscope, squashed side-by-side, JPS stereoscopic JPEG and 2D-plus-depth.

9. The device as claimed in claim 1 wherein the display displays two dimensional information.

10. The device as claimed in claim 1 wherein the three dimensional image is viewed without a viewing aid.

11. The device as claimed in claim 1 wherein a viewing aid is needed to view the three dimensional image.

12. The device as claimed in claim 1 further comprising a communication interface for communicating with one or more other devices to transmit and receive the three dimensional image.

13. The device as claimed in claim 12 wherein the communication interface communicates wirelessly.

14. The device as claimed in claim 1 further comprising a control interface coupled to the processor for controlling the display.

15. A digital imaging device comprising:
   a. a lens;
   b. a plurality of sensors and a beam splitter positioned to acquire two dimensional information through the lens;
   c. a processor for implementing an application for generating a real depth map from the two dimensional information and for computing a three dimensional image from the two dimensional information and the real depth map; and
   d. a display coupled to the processor for displaying the three dimensional image.

16. The device as claimed in claim 15 wherein the application is preloaded.

17. The device as claimed in claim 15 wherein the application is available as an add-on.

18. The device as claimed in claim 15 wherein a plurality of images are acquired by the sensor.

19. The device as claimed in claim 15 wherein an angle and/or position relative to a scene is changed to acquire a second image after acquiring a first image.

20. The device as claimed in claim 19 wherein the angle and/or position is changed by freehand 21. The device as claimed in claim 15 wherein a burst mode is used to acquire the two dimensional information.

22. The device as claimed in claim 15 wherein the processor implements a distortion correction.

23. The device as claimed in claim 15 wherein the digital imaging device is selected from the group consisting of a digital still camera and a digital camcorder.

24. The device as claimed in claim 15 wherein the two dimensional information includes a set of images.

25. The device as claimed in claim 15 wherein the sensor is selected from the group consisting of a charge coupled device and a complementary metal-oxide-semiconductor.

26. The device as claimed in claim 15 wherein the two dimensional information is processed including compression, formatting, resolution enhancement, and color enhancement.

27. The device as claimed in claim 15 wherein the three dimensional image is stored in a local memory in a stereo format.

28. The device as claimed in claim 27 wherein the stereo format is one or more of above-below, line-alternate, side-by-side, cyberscope, squashed side-by-side, JPS stereoscopic JPEG and 2D-plus-depth.

29. The device as claimed in claim 15 wherein the display displays two dimensional information.

30. The device as claimed in claim 15 wherein the three dimensional image is viewed without a viewing aid.

31. The device as claimed in claim 15 wherein a viewing aid is needed to view the three dimensional image.

32. The device as claimed in claim 15 further comprising a communication interface for communicating with one or more other devices to transmit and receive the three dimensional image.

33. The device as claimed in claim 32 wherein the communication interface communicates wirelessly.

34. The device as claimed in claim 15 further comprising a control interface coupled to the processor for controlling the display.

35. A method of acquiring, generating and displaying a three dimensional image programmed in a memory of a device comprising:
   a. acquiring two dimensional information;
   b. generating a depth map from the two dimensional information;
   c. generating a three dimensional image from the two dimensional information and the depth map; and
   d. displaying the three dimensional image viewable without a viewing aid.

36. The method as claimed in claim 35 wherein the three dimensional image is displayed on a display on an acquisition device.

37. The method as claimed in claim 35 wherein the three dimensional image is displayed on a display on a secondary device.

38. The method as claimed in claim 35 wherein the three dimensional image is displayed by printing.

39. The method as claimed in claim 35 wherein the two dimensional information is acquired by moving at least one of a movable lens and a movable sensor.

40. The method as claimed in claim 35 wherein the two dimensional information is acquired with a plurality of lenses and a plurality of sensors.

41. The method as claimed in claim 35 wherein the two dimensional information is acquired by taking a plurality of pictures from different angles and/or positions.

42. The method as claimed in claim 41 wherein the plurality of pictures are taken freehand 43. The method as claimed in claim 41 wherein the plurality of pictures are taken using burst mode.

44. The method as claimed in claim 35 wherein an application is utilized to generate the three dimensional image from the two dimensional information.

45. A method of acquiring, generating and displaying a three dimensional image programmed in a memory of a device comprising:
   a. acquiring two dimensional information, wherein the two dimensional information is acquired with a beam splitter and a plurality of sensors;
   b. generating a depth map from the two dimensional information;
   c. generating a three dimensional image from the two dimensional information and the depth map; and
   d. displaying the three dimensional image.

* * * * *